Feb. 3, 1970
E. S. McKEE
3,493,297
SOUND MOTION PICTURE PROJECTOR WITH FILM THREADING MECHANISM
Filed Aug. 16, 1966
2 Sheets-Sheet 1
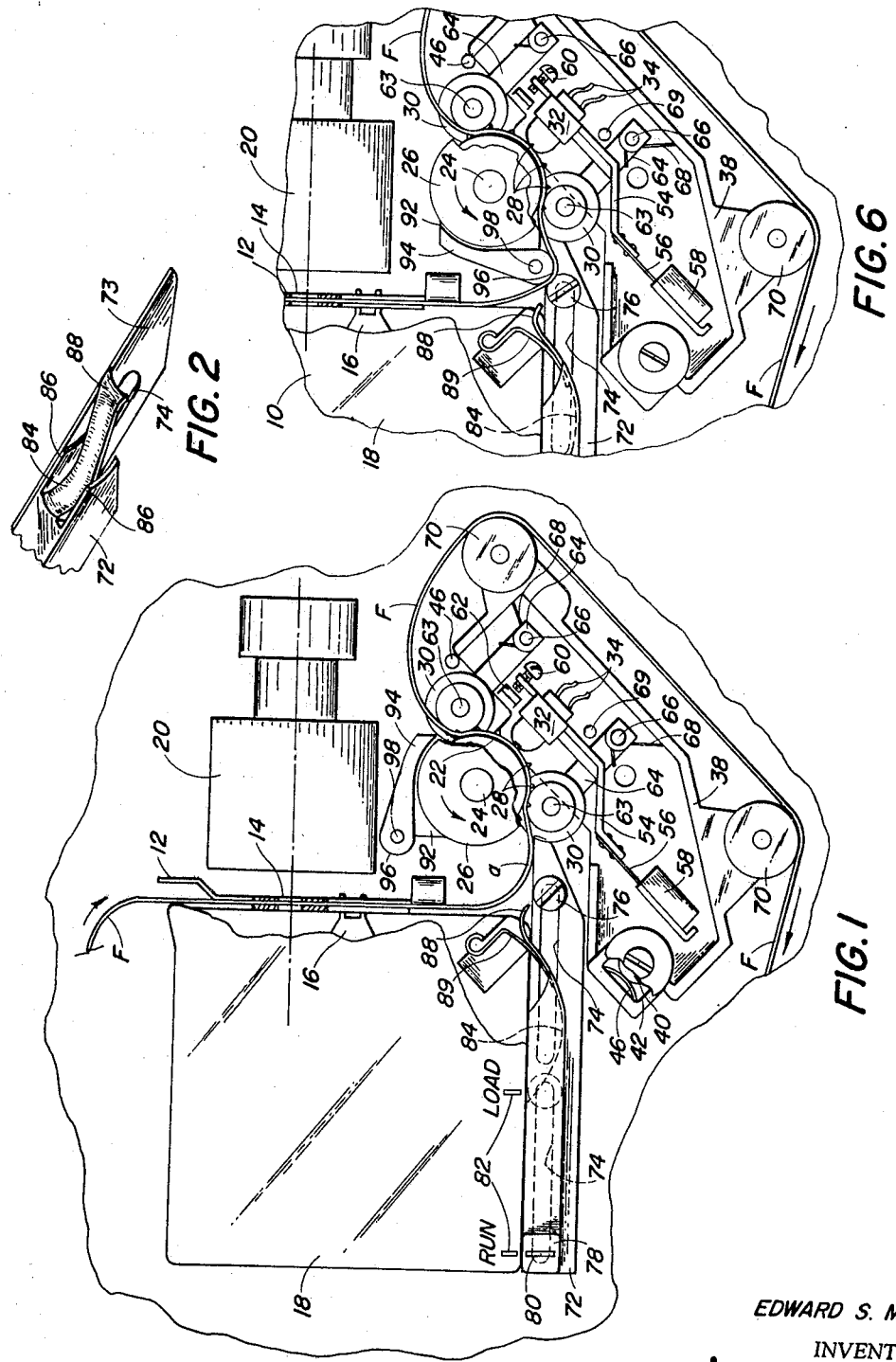
EDWARD S. McKEE
INVENTOR.
BY
*James A. Smith*
*Robert W Hampton*
ATTORNEYS Feb. 3, 1970

E. S. McKEE 3,493,297

SOUND MOTION PICTURE PROJECTOR WITH FILM THREADING MECHANISM

Filed Aug. 16, 1966

EDWARD S. McKEE
INVENTOR.

BY
*James A. Smith*
*Robert W. Hampton*
ATTORNEYS

United States Patent Office 3,493,297
Patented Feb. 3, 1970

3,493,297
SOUND MOTION PICTURE PROJECTOR WITH FILM THREADING MECHANISM
Edward Sherman McKee, Rochester, N.Y., assignor to Eastman Kodak Company, Rochester, N.Y., a corporation of New Jersey
Filed Aug. 16, 1966, Ser. No. 572,718
Int. Cl. G03b 31/02
U.S. Cl. 352—29                9 Claims

ABSTRACT OF THE DISCLOSURE

A motion picture sound projector is provided with a film guiding mechanism comprising an elongated member slidably mounted on the projector housing. The elongated member is provided with a curved film guiding surface and is movable to position the surface so that it will direct a film end along a curved path between a film gate and a sound head. During such movement the film guiding member also engages and displaces the sound head relative to a sound drum to facilitate threading of the film end between the sound head and drum. Such movement of the film guiding member also causes movement of a separate loop forming member which also may be moved independently to a loop forming position during operation of the projector.

---

This invention relates to film threading mechanisms and more particularly to a film threading mechanism for a motion picture sound projector.

Devices for facilitating the threading of film through a motion picture projector are known in the art. For example in U.S. Patent No. 2,420,587 there is disclosed a motion picture projector having film guiding members which are adapted to be pivotally displaced to guide the film during threading. In the case of a silent motion picture projector such threading devices are relatively effective and relieve the user of the projector of much of the normal threading chore.

In the case of a motion picture sound projector film threading is more of a problem due to the presence of a sound drum and sound pickup head between which the film must be inserted during the threading operation. Some current motion picture sound projectors incorporate means for positioning the sound head away from the sound drum during the threading operation and for guiding the film relative to the sound drum during threading. Such threading means, however, have not been particularly effective and require positioning of several parts by the operator.

It is a principal object of the present invention to provide an improved film threading mechanism for a sound projector.

Another object of the invention is to provide a film threading mechanism for a motion picture sound projector having a single control member which is displaced by the operator to effect film threading.

In the disclosed specific embodiment of the invention a sound drum is rotatably mounted on a projector housing to be engaged by a film moved through the projector. A sound head is movably mounted on the housing and is positioned in contact with the film on the sound drum during film projection to detect the sound program recorded on the film sound track. During film threading a slide member defining film guiding surfaces is positioned relative to the projector housing to displace the sound head and associated parts away from the sound drum and position the film guiding surfaces to guide the film between the sound drum and the sound head and associated parts to facilitate threading of the film through the projector. Movement of the slide member is also effective to position a film loop forming member between one end of the projector film gate and the sound drum to insure the formation of a film loop adjacent the film gate during the threading operation. The loop forming member may be positioned independently of the slide member during film projection to re-establish the film loop if it should be lost for any reason during film projection.

Other objects and advantages will become apparent from the following description taken in connection with the accompanying drawings wherein:

FIG. 1 is a side view of a portion of a motion picture sound projector showing a film threading mechanism in accordance with the invention;

FIG. 2 is a perspective view of a portion of the slide member shown in FIG. 1 illustrating the film guiding surfaces formed thereon;

FIG. 6 is a view similar to FIG. 1 illustrating the position of the parts during loop forming.

Figure 3:
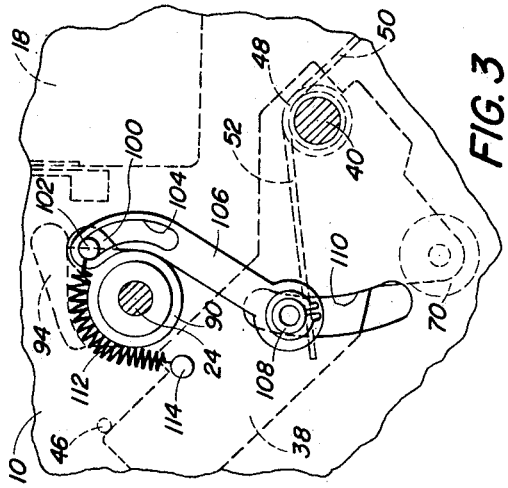
FIG. 3 is a rear view of a portion of the assembly shown in FIG. 1 illustrating the biasing means and connecting linkage for parts shown in FIG. 1.

Referring to FIGS. 1, 2 and 3 of the drawings there is shown the parts of a motion picture sound projector which are necessary for an understanding of the present invention or which are unique in accordance with the preferred embodiment of the present invention. More specifically there is shown a projector housing 10 on which is supported a film gate 12 defining a projection aperture 14. A motion picture film F having suitable perforations along one edge thereof and a sound track along the opposite edge is intermittently advanced through the gate 12 during film projection by a film claw 16 movable through an in and out and up and down pull down cycle relative to the gate 12. The film claw 16 forms part of a film advancing mechanism (not shown) supported on the housing 10 and enclosed by a cover plate 18 and which may take the form of the film advancing mechanism utilized in the commercially available Instamatic Model 60 Projector manufactured by Eastman Kodak Company.

A lens system contained within a housing 20 is supported on the projector housing 10 with its optical axis aligned with the aperture 14. The lens system may also take various forms known in the art and further description is deemed to be unnecessary.

The film F leaving the gate 12 engages and is transported by a sound drum 22 rotatably mounted on the housing 10 adjacent the lower end of the film gate 12 by means of a shaft 24. The drum 22 is provided with a relatively smooth peripheral surface intermediate a guide flange 26 and a row of sprocket teeth 28, the latter being arranged to engage the film perforations to thereby transport the film in response to rotation of the sound drum 22. A pair of spaced rollers 30 engage the film and retain a portion of the filmstrip in engagement with the peripheral surface of the drum 22 and sprocket teeth 28 during movement of the film through the projector. A sound pick up head 32 engages the surface of the film on the drum intermediate the rollers 30 and is effective to establish an electrical signal in lead wires 34 in accordance with the sound program recorded on the sound track of the film.

The sound drum 22 is continuously driven by the projector drive means (not shown) in synchronism with the film advancing mechanism to move the film past the sound head 32 at the same rate as the film is intermittently advanced through the gate 12. Preferably a free loop of film indicated by the reference letter a in FIG. 1 is maintained between the gate 12 and the sound drum 22 during film projection to permit intermittent motion of the film through the gate 12 and continuous motion of the film over the sound drum 22.

Referring now to the specific structural features embodying the present invention the sound head 32 and rollers 30 are supported on a movable supporting plate 38 whereby the assembly comprising said parts can be displaced away from the sound drum 22. More specifically the plate 38 is pivotally mounted on one end of a shaft 40 extending through the wall of the housing 10. The end of the shaft 40 is received in a recess 42 having an aligning spring 44 mounted therein to effect engagement of the shaft 40 with self aligning bearing surfaces of the recess 42.

The plate 38 is biased in a counterclockwise direction toward engagement with a stop pin 46 fixed to the housing 10 by a coiled wire torsion spring 48 (FIGS. 3 and 5) which encircles the shaft 40 interiorly of the housing 10 and has one end 50 secured to the housing wall and the other end 52 secured to the plate 38. During film projection the plate 38 engages the stop pin 46 under the bias of spring 48 but is adapted to be displaced to the position shown in FIG. 4 during film threading by the means later to be described.

The sound head 32 is mounted on one end portion of a rigid arm 54 the other end of which is fixed to the end of a hinge spring 56 extending from a supporting block 58 fixed to the plate 38. An adjustable abutment screw 60 is threaded through the end of the arm 54 and is adapted to engage a stop 62 to limit displacement of the arm 54 in a counterclockwise direction. When the plate 38 is in the position shown in FIG. 4 the arm 54 is biased counterclockwise by a hinge spring 56 to the position shown wherein screw 60 engages stop 62. Engagement of the sound head 32 with the film on the sound drum 22 will displace arm 54 clockwise a slight amount away from stop 62 as shown in FIG. 1 against the biasing force of the hinge spring which maintains engagement of the sound head 32 with the film.

The rollers 30 are rotatably mounted on suitable shafts 63 carried on the ends of a pair of supporting arms 64 the opposite ends of which are pivotally mounted on the plate 38 by pins 66 respectively. A pair of coiled wire torsion springs 68 encircle the pins 66 and are suitably arranged to bias the arms 64 toward each other and into engagement with stops 62 and 69 respectively in the position of the plate 38 shown in FIG. 4. When the plate 38 is displaced from the position shown in FIG. 4 to the position shown in FIG. 1 the rollers will engage the film on the sound drum and be displaced slightly out of engagement with stops 62 and 69 respectively, the torsion springs 68 serving to maintain engagement of the rollers with the film. The rollers 30 may also be biased toward the ends of their respective shafts 63 to maintain engagement of the film edge with the sound drum flange 26 to insure proper film alignment.

To complete the plate 38 assembly a pair of guide rollers 70 are rotatably mounted on the plate 38 in spaced relationship to define a film path around the plate 38 and sound parts. During film projection the film is taken from roller 30 around the rollers 70 and then to a take-up reel (not shown).

In the position of the supporting plate 38 shown in FIG. 1 the rollers 30 and sound head 32 resiliently engage the film on the drum 22 and the parts associated with the sound pick-up system are thus positioned for normal film projection. In the position of the supporting plate 38 shown in FIG. 4 the rollers 30 and sound head 32 are out of engagement with the film to permit threading of the film around the sound drum 22 by the means now to be described.

Referring now to the film threading means, a slide member on bar 72 having a plate-like extension 73 extending from the right end thereof is provided with a pair of spaced elongated slots 74 and slidably mounted on the housing 10 by means of a pair of screws 76 extending through the slots 74 and threaded in the wall of housing 10. The slide member 72 is provided with an operating handle 78 and is adapted to be manually positioned between a film projection position (FIG. 1) and a film threading position (FIG. 4) by means of said handle. An index 80 on the slide member 72 is adapted to be selectively aligned with spaced indices 82 on the housing 10 to define the two positions of the slide member.

Figure 4:
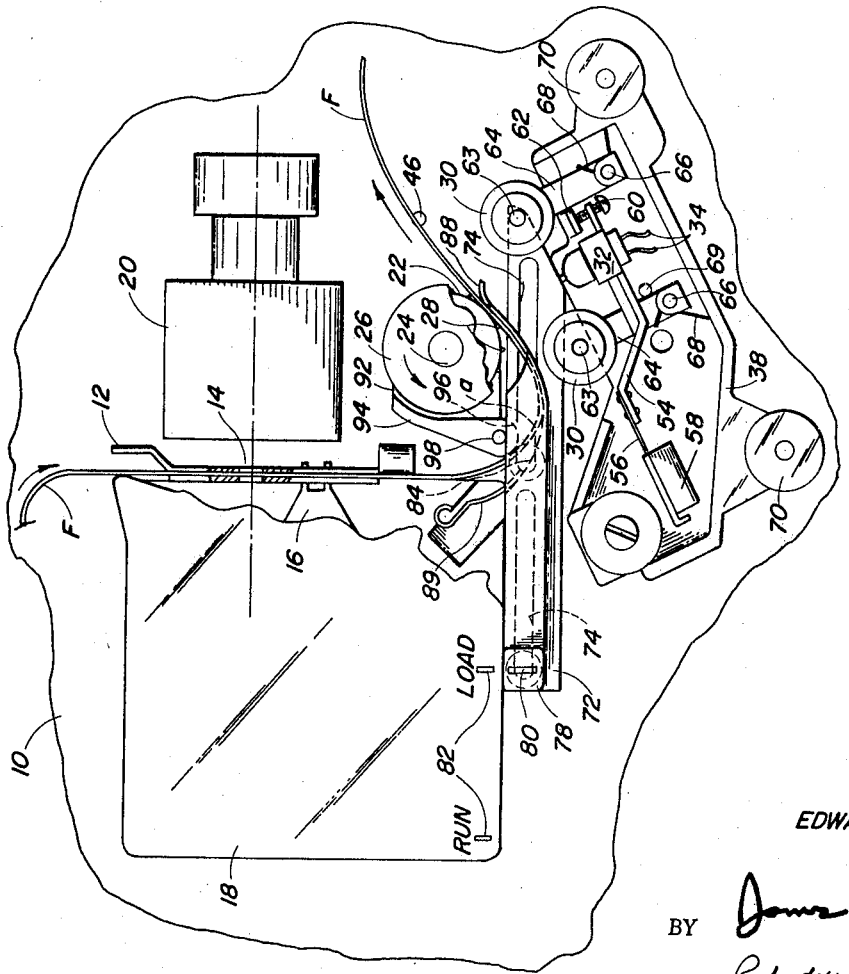

When the slide member 72 is displaced from its film projection position shown in FIG. 1 to its film threading position shown in FIG. 4 the edge of the plate-like extension 73 of slide member 72 will engage the edge of plate 38 and pivot the latter clockwise about shaft 40 against the bias of spring 48 to the position shown in FIG. 4. Thus, displacement of the slide member 72 to the right will displace the assembly comprising plate 38, rollers 30, and sound drum 32 and associated parts to the film threading position thereof.

The slide member 72 in addition to providing a means for displacing the plate 38 and the assembly supported thereby to a film threading position, defines a film guide surface or chute which guides a film end discharged from the bottom of the gate 12 to and around the sound drum 22. Referring more specifically to FIGS. 1 and 2 of the drawings the upper right end portion of the slide member 72 is hollowed out to define a curved surface 84 bounded by a pair of side walls 86. The end of the slide member 72 is provided with a thin flexible extension 88 defining an extension of surface 84 and having a reversely curved tip portion.

In the film threading position of the slide member 72 shown in FIG. 4, the curved film guide surface 84 will substantially bridge the gap between the lower end of gate 12 and sound drum 22. The flexible extension 88 will be positioned in contact with the surface of drum 22 as shown in FIG. 4. During threading the film end discharged from the lower end of gate 10 will engage the curved surface 84 and be guided toward and around the sound drum 22. The extension 88 will position the film in contact with the drum surface so that the drum sprocket teeth will engage the film perforations and the sound drum will take up the film. The slide member 72 may then be returned by the operator to the position shown in FIG. 1. The plate 38 and assembly supported thereby will be returned to the position shown in FIG. 1 by spring 48 to position sound head 32 and rollers 30 in engagement with the film surface. The operator may then position the film around rollers 70 and attach the film end to the takeup spool (not shown).

As a further feature of the invention means are also provided for insuring that films tending to curl will be guided in the proper direction by surface 84 to slide member 72. This means comprises a flexible film deflector 89 having a width complemental to that of the film and positioned below the gate 10 to turn the film end toward the sound drum 22 before it actually engages surface 84. One end of the deflector 89 is clamped to the housing 10 as shown while the other end extends downward toward the slide member 72. When the slide member 72 is in the film projection position shown in FIG. 1 the extension 88 engages the end of deflector 89 and displaces it to the left out of possible contact with the film. When the slide member 72 is in the position shown in FIG. 4 the end of deflector 89 is engaged by the surface 84 and displaced to the right to its film guiding and deflecting position. When so positioned the deflector defines a guide surface between the bottom edge of the gate 12 and surface 84 to prevent the ends of films tending to curl to the left as viewed in FIG. 1 from turning into the space between the gate 12 and surface 84 before the film end engages and is guided by surface 84.

Referring now to the loop forming means in accordance with the invention, a tubular sleeve 90 (FIGS. 3 and 5) is rotatably mounted on the wall of housing 10 in coaxial relationship with shaft 24. One end of the tubular sleeve 90 is provided with an integral arm 92 (FIGS. 1, 4 and 6) extending beyond the periphery of sound drum 22. An integral loop forming member 94 defining a curved film engaging surface 96 and having an operating handle 98 is formed on the end of arm 92 to be displaced between the positions shown in FIGS. 1 and 4 upon rotation of the sleeve 90.

Figure 5:
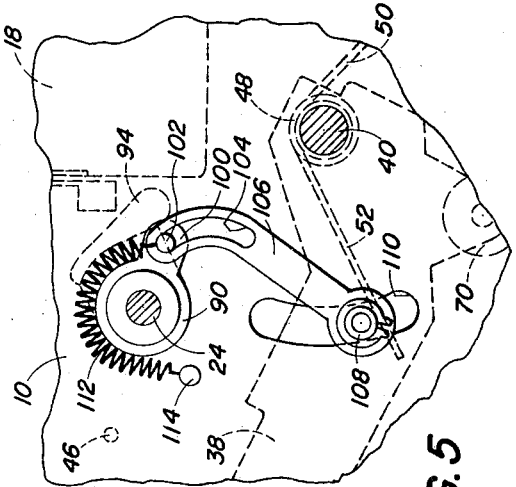
FIGS. 4 and 5 are views similar to FIGS. 1 and 3 respectively illustrating the position of the parts during film threading respectively.

The end of the sleeve 90 within the housing 10 is provided with an integral arm 100 to which is fixed positioning pin 102. The pin 102 is slidably received in an elongated curved slot 104 formed in one end of a link 106 the other end of which is pivotally connected to a shaft 108 fixed to the rear surface of the plate 38 and extending through a curved slot 110 in the wall of housing 10. The tubular sleeve 90 is biased in a counterclockwise direction as viewed in FIGS. 3 and 5 by a coil spring 112 having one end connected to a pin 114 fixed to the wall of the housing 10 and the other end thereof connected to pin 102. The sleeve 90 is normally rotated counterclockwise by spring 112 to a position wherein pin 102 engages the upper end of slot 104 in link 106 as shown in FIGS. 3 and 5.

Considering now the operation of the loop forming means, when the plate 38 is in the position shown in FIG. 1 during film projection link 106 will be in the position shown in FIG. 3 and loop forming member 90 will assume the position shown in FIG. 1 wherein pin 102 engages the end of the slot 104 under the bias of spring 112. If plate 38 is displaced to the film threading position thereof shown in FIG. 4 the accompanying displacement of link 106 will pull pin 102 downward as viewed in FIG. 3 to angularly displace the sleeve 90 and arm 100 to the position shown in FIG. 5, and thereby displace the loop forming member downward to the position shown in FIG. 4.

When the loop forming member 90 is in the position shown in FIG. 4, the curved surface 96 thereof is positioned in spaced relationship with the film guiding surface 84 of slide member 72 with sufficient clearance so that the film end will freely move between the two surfaces. The loop forming member 94 insures that the film will follow the curved surface 84 of the slide member to establish the loop configuration. The loop forming member 94 is particularly effective in the case of film having a clockwise curl in that it prevents the film curl from causing the film to bridge the curved surface 84.

The loop forming member 90 also comprises a means for re-establishing the film loop if it is lost for any reason during film projection. More particularly, during film projection when the link 106 is in the position shown in FIG. 3, the assembly comprising sleeve 90, pin 102 and loop forming member 94 may be angularly displaced by handle 98 relative to link 106 against the bias of spring 112 to position the loop forming member 94 to the loop forming position illustrated in FIG. 6. During downward displacement, the surface 96 of loop forming member 94 will engage the film and displace the same sufficiently to provide sufficient slack between the gate 12 and sound drum 22 to restore the loop. When the operator releases handle 98, the sleeve 90, loop forming member 94 and pin 102 will be returned to the position shown in FIGS. 1 and 3 by the biasing force of spring 112. It will be apparent that slot 104 may be suitably elongated to establish the necessary range of displacement of loop forming member 94 during loop re-establishment.

While only one specific embodiment of the invention has been herein shown and described, it will be apparent to those skilled in the art that many changes may be made in the structure and arrangement of parts disclosed without departing from the scope of the invention as defined in the appended claims.

It is claimed and desired to secure by Letters Patent of the United States:

1. In a motion picture sound projector for film having a sound track, the combination comprising:

a projector housing;

a film gate supported on said housing through which film is advanced during film projection;

means for detecting the sound track on the film including a member mounted on said housing to be continuously engaged by film advanced through said gate, and a sound head movably supported on said housing for detecting the sound track on the film during engagement of the film with said member;

means defining a film guiding surface movably mounted on said housing and movable to a film guiding position relative to said housing for engaging and displacing said sound head away from said member and for simultaneously positioning said film guiding surface between said gate and said member to guide the end of the film from said film gate between said member and said sound head during film threading;

film loop forming means movable relative to said housing to a loop forming position between said gate and said sound track detecting means;

means for displacing said loop forming means to said loop forming position in response to movement of said film guiding means to said film guiding position; and means for displacing said loop forming means to said loop forming position independently of said film guiding means.

2. In a motion picture sound projector having drive means for moving film having perforations and a sound track through the projector, the combination comprising:

a projector housing;

a film gate supported on said housing through which film is adapted to be intermittently advanced during film projection;

a sound drum rotatably mounted on said housing in spaced relationship with one end of said film gate to be engaged by the film intermittently advanced through said gate, said sound drum including sprocket teeth engageable with the film perforations;

a sound head adapted to engage the film during engagement of the film with said sound drum;

a member movably mounted on said housing supporting said sound head, said member having a first position wherein said sound head is positioned to engage the film as the film engages said drum and a second position wherein said sound head is displaced from said drum;

means for biasing said supporting member toward said first position thereof;

an elongated film guiding member defining a curved film guiding surface on one end portion thereof, said film guiding member being slidably movable relative to said housing to engage and displace said supporting member from said first to said second position thereof and to simultaneously position said film guiding surface between said one end of said gate and said sound drum to guide a film end between said drum and said sound head; and a flexible extension extending from said one end portion of said film guiding member thereof to engage said sound drum in said film guiding position of said film guiding member to facilitate engagement of said sprocket teeth with the film perforations during film threading.

3. In a motion picture sound projector as claimed in claim 2 wherein said film guiding member is provided with a pair of spaced elongated slots and further including a pair of screws extending through said slots and threaded in said housing to slidably support said film guiding member on said housing.

4. In a motion picture sound projector as claimed in claim 2 further including a flexible film deflecting member extending from said housing at said one end of said gate to guide the end of film tending to curl into engagement with said film guiding surface of said film guiding member.

5. In a motion picture sound projector as claimed in claim 2 wherein said supporting member comprises a plate pivotally mounted on said housing and further including a pair of spaced rollers rotatably supported on said plate to engage and retain the film in engagement with said sound drum in said first position of said supporting member.

6. In a motion picture sound projector for film having a sound track, the combination comprising:
a projector housing;
a film gate supported on said housing through which film is advanced during film projection;
a sound drum rotatably mounted on said housing in spaced relationship with one end of said film gate to be engaged by the film advanced through said gate;
a sound head;
a plate pivotally mounted on said housing for supporting said sound head, said plate having a first position wherein said sound head is positioned adjacent said drum to detect the sound track on the film as the film engages said sound drum and a second position wherein said sound head is displaced from said sound drum;
means for biasing said supporting plate toward said first position thereof;
means for displacing said supporting plate from said first to said second position thereof and for guiding a film end from said gate to said sound drum along a predetermined path having a film loop configuration;
loop forming means comprising a tubular member rotatably mounted in a wall of said housing and having an integral loop forming member extending from one end of said tubular member and defining a loop forming surface, said loop forming means having a first position wherein said surface is positioned between said one end of said gate and said sound drum to cooperate with the last said means to define said path to facilitate the formation of a film loop between said gate and said sound drum during film threading, said loop forming means having a second position wherein said loop forming surface is displaced from said loop forming position; and
an operative connection between said supporting plate and said loop forming means for effecting movement of said loop forming means from said second position to said first position thereof in response to displacement of said supporting plate from said first to said second position thereof.

7. In a motion picture sound projector as claimed in claim 6 further including means for positioning said loop forming means from said second to said first position thereof independently of movement of said supporting plate.

8. In a motion picture sound projector as claimed in claim 7, further including:
an arm extending from the other end of said tubular member;
a pin fixed to said arm;
a shaft fixed to said supporting plate; and
said operative connection comprising a link having one end receiving said pin and the other end thereof pivotally connected to said shaft.

9. In a motion picture sound projector as claimed in claim 8 wherein said one end of said link is provided with an elongated slot for receiving said pin, and wherein said biasing means for said loop forming means biases said tubular member to effect engagement of said pin with said link at one end of said slot, said slot permitting movement of said tubular member and pin independently of said supporting plate whereby said loop forming means can be positioned to said first position thereof independently of said supporting plate.

References Cited

UNITED STATES PATENTS

| 2,051,036 | 8/1936 | Foster et al. | 242—55.11 |
| 3,040,134 | 6/1962 | Berndt et al. | 352—30 |
| 3,201,796 | 8/1965 | Michaels | 352—30 |
| 3,233,958 | 2/1966 | Kaess et al. | 352—30 |
| 3,260,564 | 7/1966 | Woelfel | 352—29 |
| 3,362,772 | 1/1968 | Rube | 352—29 |

NORTON ANSHER, Primary Examiner

MONROE H. HAYES, Assistant Examiner

U.S. Cl. X.R.

352—157, 159